Patented Oct. 10, 1950

2,525,354

UNITED STATES PATENT OFFICE 2,525,354

CATALYTIC REFINING OF HYDROCARBON ALCOHOLS

Han Hoog, Willem Frederik Engel, and Jacob Koome, Amsterdam, Netherlands, assignors to Shell Development Company, San Francisco, Calif., a corporation of Delaware No Drawing. Application December 5, 1949, Serial No. 131,254. In the Netherlands December 17, 1948

9 Claims. (Cl. 260—643)

This invention relates to the catalytic refining of synthetically produced hydrocarbon alcohols. The invention relates more particularly to the catalytic refining of synthetically produced hydrocarbon alcohols containing contaminants comprising unsaturated organic impurities.

The alcohols, to the refining of which the present invention is directed, are the hydrocarbon alcohols, for example, those having from two to twenty carbon atoms to the molecule, synthetically produced by any of the presently available methods. Processes for the synthesizing of hydrocarbon alcohols comprise, for example, those involving the catalytic hydration of an olefin, such as ethylene; the hydrogenation of aldehydic reaction products obtained by the reaction between carbon monoxide, hydrogen and organic unsaturated compounds containing an olefinic unsaturation, often referred to as the OXO process, etc. Examples of the crude synthetic alcohols refined in accordance with the present invention comprise, ethanol, propanol, butanols, and mixtures thereof, obtained by the catalytic hydration of the corresponding olefins, ethene, propene, butenes, and mixtures thereof, respectively; the pentanols, hexanols, heptanols, octanols, nonanols, decanols, hendecanols, dodecanols, tridecanols, their homologues, and mixtures comprising two or more such alcohols, obtained by the hydrogenation of the corresponding aldehydic product resulting from the interaction of carbon monoxide, hydrogen, and an olefin such as a butene, pentene, hexene, heptene, octene, nonene, decene, their homologues, and mixtures thereof.

The synthetically produced hydrocarbon alcohols generally contain varying amounts of contaminants which limit considerably their field of efficient application. Such contaminants comprise saturated and unsaturated carbonylic compounds including ketones, aldehydes, ethers, and condensation products thereof, which may have been formed during the synthesis of the alcohols or during the recovery of the alcohols from the reaction mixtures obtained in their production. The relatively small amounts of residual contaminants, and the complexity of the mixture which constitutes them, render exceedingly difficult their analysis. The impurities encountered in contaminating amounts in the synthetic lower alcohols, such as ethanol obtained by hydration of ethene, may include di-ethyl ether, secondary butanol, acetaldehyde, crotonaldehyde, acrolein, and higher boiling saturated and unsaturated aldehydes, in particular branched aldehydes. The higher synthetic alcohols will generally contain corresponding saturated and unsaturated carbonylic impurities of correspondingly higher molecular weight.

The contaminant mixture in the synthetic alcohols is capable of reducing potassium permanganate. By measuring the time required for such reduction it is possible to determine the degree of contamination. This potassium permanganate test is used in the case of lower alcohols, such as ethanol, and can be carried out as follows:

2 cubic centimeters of a solution containing 0.2 gram $KMnO_4$ per liter are added to 50 cubic centimeters of the alcohol under examination, which is kept at a temperature of 15° C. The time, expressed in minutes, necessary to bring about complete disappearance of the rose color, is known as the permanganate time of the sample and referred to as P. M. T.

The presence of the impurities even in relatively minor amounts will generally render the alcohol so contaminated unsuited for many uses. The presence of the aldehydic constituents in an amount above about 0.5% in the higher alcohols, such as those having from five to twenty carbon atoms to the molecule will render impossible the production of substantially colorless esters, such as the phthalic acid esters, without additional operative procedures. Reduction of the aldehyde content to below 0.2% by weight is often required to enable the efficient use of the alcohol in a specific field of application. Indication of the removal of at least a substantial part of such residual aldehydic impurities is of itself not always an assurance of a degree of purification of the alcohol enabling the production of substantially colorless esters therefrom. The absence of coloration in the phthalic acid ester of the synthetic alcohol is therefore relied upon as a criterion of the degree of purity of the alcohol from which the ester is obtained.

The substantially complete removal of the residual impurities inherent in crude synthetic alcohols, or their removal to a degree enabling the production of substantially colorless phthalic acid esters therefrom, without incurring any substantial loss of the alcohol treated or without resorting to operative steps of undue complexity and cost, is often rendered difficult if not impossible by the use of methods generally available heretofore.

Methods have been disclosed heretofore for the treatment of alcohols with hydrogen in the presence of nickel. Although some of these methods enable a substantial reduction in the amount of aldehydes in the alcohol, such processes are generally impractical for the removal of the type of residual impurity encountered in synthetic alcohols to the extent necessary to render such alcohols suitable for use in certain fields of application as, for example, the production of colorless esters. Treatment of alcohols by contact with a suspension of finely divided catalyst consisting of nickel on an adsorptive support has been suggested. Not only are most of such catalysts ineffective in attaining the necessary degree of purification in the absence of substantial loss of alcohol treated, but their use is handicapped by the many difficulties inherent in the use of a catalyst in the form of suspension.

Attempts to remove the impurities in the synthetic alcohols by contact in the vapor phase with stationary beds of solid catalyst of the type generally used heretofore wherein the nickel is admixed with, or deposited upon, supports are found to be ineffective in reducing to a sufficient degree the contaminants encountered in these materials. Experiments wherein ethanol, obtained by the hydration of ethene, was contacted in the vapor phase with a stationary bed of catalyst consisting of nickel deposited on kieselguhr and containing 16.5% nickel resulted in a treated ethanol which had a P. M. T. value of 9 minutes, indicating the retention of unsaturated impurities in an amount far in excess of that tolerated in many fields of application of the alcohol. Unsuitability of this type of catalyst was further evidenced by experiments wherein nonyl alcohol, obtained in the OXO process, was treated in the vapor phase in the presence of hydrogen with a bed of pelleted catalyst consisting of nickel deposited upon alumina and containing 10% of nickel in the form of reduced nickel. The catalyst underwent rapid disintegration during the operation due to poor mechanical strength, and after a period of operation of only one hundred hours its activity was such as to result in a treated alcohol which had an aldehyde content in excess of 0.8% by weight and the phthalic acid ester prepared therewith was badly discolored.

The use of formed catalysts having a very high nickel content, for example, about 90%, of the type obtained by dry mixing nickel carbonate and an adsorbent support followed by forming, decomposition of the nickel carbonate and reduction of the nickel results in catalysts of such exceedingly poor mechanical strength as to preclude their efficient use. Extreme difficulties are encountered in their use in the form of stationary catalyst beds resulting from crumbling and deterioration of the catalyst during use, such as channeling, clogging of apparatus, catalyst entrainment, etc.

It has now been found that the above difficulties are obviated to at least a substantial degree and that the synthetic alcohols contaminated with organic impurities are refined efficiently by contacting them in admixture with hydrogen, in the vapor phase, with a stationary bed of solid nickel-containing catalyst having a high nickel content and wherein the nickel is promoted by the presence of nickel silicate. In accordance with the invention a synthetic alcohol containing contaminating amounts of organic impurities is refined by contact, in the vapor phase, in admixture with hydrogen with a solid catalyst consisting essentially of an intimate mixture of nickel, nickel silicate and a solid carrier material.

The incorporation into the nickel catalyst of nickel in the form of nickel silicate results in a catalyst which not only is particularly effective in the refining of the crude synthetic alcohols but which though of high nickel content nevertheless is of high mechanical strength enabling its use in the form of stationary beds.

A particular advantage of the process of the invention resides in its ability to utilize as support for the nickel and nickel compounds in the catalysts any of the many readily available carrier materials in combination with a high nickel content without sacrifice of either strength or effectiveness of the catalysts. Thus, examples of carrier materials which are used as solid support component of the catalyst are the various aluminous and silicious materials of natural or synthetic origin, such as bauxite, aluminum oxide, activated alumina, kieselguhr, magnesium oxide, magnesium silicate, magnesium carbonate, barium sulphate, pumice, kaolin, activated carbon, clays including the various types of non-acid treated and acid treated clays, carborundum, alundum, and the like. Of the above class of solid support materials those possessing adsorptive properties are preferred, such as, for example, adsorptive alumina, bauxite, kieselguhr and the like. A particularly effective and preferred type of support material comprises the white bauxite produced in Surinam.

In order to attain the objects of the invention it is essential that nickel be present in the catalyst in high concentration. The catalysts of the invention have a nickel content above about 25% by weight. Those wherein the total nickel content is above about 35% have been found to be particularly effective in the refining of the synthetic alcohols. The total nickel content of the catalysts may range as high as 90% without encountering any substantial physical disintegration during use. As indicated above, an essential feature of the invention is the presence in the catalysts of nickel in the form of the nickel silicate in addition to reduced nickel. The amount of nickel present in the form of the silicate should be equal to at least 20% of the total nickel content of the catalyst and should not exceed about 60% of the total nickel content of the catalyst.

The catalysts employed in the process of the invention containing a total nickel content, and a nickel silicate content, within the above prescribed limitations may be prepared by the method of catalyst preparation disclosed and claimed in co-pending application Serial No. 2,133, filed January 13, 1948. The catalyst may be prepared, for example, by preparing an aqueous solution of a soluble nickel salt, such as, for example, nickel nitrate, and adding the solid support material, such as, for example, alumina, to this solution and slurrying it therein. A suitable amount of soluble silicate, such as, for example, sodium or potassium silicate, is added to an alkaline solution to be used as precipitating agent, such as, for example, commercial soda containing sodium hydroxide and sodium carbonate in approximately equal amounts, and this mixture of solutions is then added to the slurry of nickel nitrate and support material, to cause the precipitation of the mixed silicate, hydroxide, and bicarbonate of nickel. The carbonate, bicarbonates, hydroxides and silicates of sodium and potassium are generally used although the corresponding compounds of the other alkali metals can be used in the catalyst preparation. In making up the alkali solution, total amount of alkali required to precipitate all the nickel is first calculated and then the desired portion of the total alkali, e. g. 20 to 60%, is substituted by the alkali silicate solution taking into consideration the ratio of alkali to silica in the alkali silicate used. It is convenient to first adjust the alkali in the silicate solution to give the meta-silicate. When a sodium or potassium carbonate solution is used it is desirable to add the silicate solution thereto just prior to the precipitation in order to avoid flocculation of the silica. The alkali may be added to the slurry or the slurry may be added to the alkali solution, or the two liquids may be simultaneously introduced into a mixing and precipitating zone. While the carrier material is preferably slurried with the nickel salt solution, it may, if desired, be slurried with the alkali solution. The solid support material may also, if desired, be added after the precipitation is partially completed or wholly completed by mixing it with the wet precipitate or by combining it with the precipitate after washing and drying.

In an alternative method the solutions of the nickel salt and the alkali are combined, either in the presence or absence of the carrier material, the proportion of alkali being insufficient to precipitate all of the nickel, and then a dilute solution of alkali silicate is added to complete the precipitation.

In another alternative, the carrier is slurried with a solution of the alkali silicate. The solution of the nickel salt is then added causing precipitation of the nickel silicate. Finally the remaining portion of the nickel salt is precipitated by the alkali, e. g. potassium or sodium carbonate.

In still another method the nickel salt is precipitated with alkali in the usual manner in the presence or absence of the carrier material. The nickel silicate is separately precipitated by any known method, e. g. by mixing solutions of an acid salt of the nickel and alkali silicate. The precipitated silicate, after washing and if desired also drying, is then mixed with the wet or dry main catalyst mass to produce the desired mixture. In these various alternatives, the precipitation may also be carried out either hot or cold and either slowly or quickly.

The mixture comprising the precipitated nickel in the form of nickel silicate and decomposable nickel compounds and carrier material is subjected to a shaping operation such as pelleting, tableting, or the like. Before or after shaping, but preferably after, the shaped mixture is subjected to conditions capable of reducing the reducible nickel compound. Reduction of the reducible nickel compound is accomplished by subjecting the shaped catalyst mixture to elevated temperature, optionally in the presence of steam, or added gases, thereby effecting the decomposition of the decomposable nickel compounds to the oxide and thereafter reducing the nickel oxide by the passage of a reducing gas, such as hydrogen, therethrough. The nickel silicate is difficultly reducible and remains in the form of the nickel silicate during the reduction of the reducible nickel compounds. Consequently the finished catalyst contains part of the nickel as finely reduced nickel in intimate admixture with non-reduced nickel silicate, which latter material confers desirable characteristics to the finished catalyst such as a promotional effect, and an enhancement of mechanical structure. It is to be stressed that the invention is in no wise limited by the method of production of the catalyst containing the nickel and nickel silicate in intimate admixture with the carrier in the proportions above prescribed.

In the refining of the synthetic alcohols in accordance with the invention the crude alcohols are contacted with a bed of the shaped catalyst in a reaction zone in the presence of hydrogen. The hydrogen employed in the process may consist of hydrogen as such or may consist of a gas containing hydrogen in admixture with other gaseous materials which are inert under the conditions of execution of the reaction. Gases capable of liberating hydrogen within the reaction zone may be introduced into the reaction zone within the scope of the invention. The hydrogen, or hydrogen-containing gas, can be combined with the alcohol charge prior to its introduction into the reaction zone or a part or all thereof may be introduced separately into the reaction zone at one or more points along the length thereof.

Refining of the synthetic alcohols in the presence of the prescribed catalysts is effected at a temperature within the range of from about 80° C. to about 200° C., and a pressure in the range of from about atmospheric pressure to about 200 atmospheres and higher. Hydrogen is introduced into the reaction zone at the rate of from about 400 to about 2000 liters and more per kg. of alcohol charged. Conditions particularly preferred within the above prescribed range of operating conditions will depend to some extent upon the particular synthetic alcohol to be refined. When refining the lower alcohols, such as synthetic ethanol, propanol, and butanol, the maintenance of a temperature in the range of from about 80° C. to about 150° C. and a pressure ranging from about atmospheric to about 10 atmospheres, with a hydrogen input of from about 400 to about 2000 liters of hydrogen per kg. of alcohol charge is preferred. When refining higher boiling alcohols, that is those having at least five carbon atoms to molecule and up to twenty carbon atoms to the molecule, such in particular as the OXO alcohols, the use of a temperature in the range of from about 100° C. to about 200° C. and preferably from about 125° C. to about 175° C. is preferred with a presure in the range of from about 50 to about 200 atmospheres and preferably above 100 atmospheres. Under such preferred conditions of temperature and pressure in the treatment of the higher synthetic alcohols it is preferred to introduce the hydrogen into the reaction zone at a rate below about 1000 liters of hydrogen per kg. of alcohol, and preferably at a rate in the range of from about 200 to about 750 liters of hydrogen per kg. of alcohol charged.

Under the above-defined conditions the synthetic alcohols containing contaminating amounts of organic impurities comprising saturated and unsaturated organic impurities are readily converted to alcohols of exceedingly high purity, containing less than 0.2% aldehydic impurities and capable of yielding esters with phthalic acid which are water white or sufficiently free of any substantial coloration to insure their use in substantially all fields of application. It is to be noted that such advantages in the presently claimed process are obtained with the use of the catalyst in the form of a stationary bed thereby obviating the disadvantages inherent in the use of finely divided catalysts, and that the operation is characterized by exceedingly long periods of active life of the catalyst.

The efficiency with which synthetic alcohols are purified in accordance with the invention is illustrated by the following examples:

Example I

A catalyst "A" consisting essentially of 40% nickel, 11.2% $SiO_2$ and 48.8% $Al_2O_3$ was prepared as follows:

0.5 liter of sodium metasilicate solution containing 56 grams $SiO_2$ was added to 4.5 liters of a boiling sodium carbonate solution containing 420 grams $Na_2CO_3$. After stirring for a few seconds, 5 liters of a boiling solution of nickel nitrate containing 200 grams Ni was added in the space of one minute. After stirring for another 2 minutes the precipitate was filtered and washed out with 24 liters of water of 95° C. in the space of 3½ hours. After ten hours' drying at a temperature of 110° C., the mass was pulverized and sifted. The mass, which contained 48% nickel, was compressed into lumps, which were again pulverized. 380 grams of this powder was mixed with 223 grams of activated Surinam bauxite in powder form which had been heated in advance to 500° C., and 6 grams powdered graphite. The mixture was compressed into lumps 5 x 3 mm. in size, which could bear a pressure of 18 kg. The catalyst was reduced by treatment with 200 liters hydrogen per hour throughout 24 hours at atmospheric pressure and a temperature of 275–300° C.

A second catalyst "B" was prepared under substantially identical conditions with the exception that adsorptive alumina was substituted for the Surinam bauxite.

Example II

A mixture of nonyl alcohols obtained by means of the OXO process and having an aldehyde content of 4.7% by weight, and wherein the presence of impurities was further evidenced by bad discoloration of the phthalic acid ester prepared therefrom (extinction coefficient K– of the phthalic ester was above 0.20 whereas the maximum generally tolerated is 0.07) was contacted in the presence of added hydrogen with a bed of the catalyst "A" and in a separate operation with the catalyst "B," which catalysts were prepared as set forth above in Example I under the following conditions:

Temperature _____°C__ 150
Pressure in At_____ 150
Throughput rate in kg. of alcohol per lit. of cat. per hr_____ 0.5
Hydrogen charge rate in lit. per kg. of alcohol charge_____ 250.

The refined alcohol obtained in the operation employing the catalyst "A" was found to have an aldehyde content of less than 0.04 after 250 hours of operation. The phthalic acid esters prepared therefrom were of excellent quality with respect to lack of discoloration, i. e. water white (coefficient of extinction K-phthalic ester=0.015). After about 500 hours of operation the aldehyde content was still less than about 0.16% and the phthalic acid esters prepared with the alcohols then obtained were substantially colorless (extinction coefficient K-phthalic acid ester=0.04).

The refined alcohol obtained from the operation employing the catalyst "B" was found to have an aldehyde content ranging from 0.4 to below about 0.20 after 300 hours of operation. Phthalic acid esters prepared with the alcohols obtained throughout the run of 300 hours were of satisfactory color, substantially colorless (the extinction coefficients K-phthalic acid esters never exceeded the value of 0.02 throughout the run). (NOTE:—A value for the extinction coefficient of 0.07 and less indicates a satisfactory phthalic acid ester with respect to absence of discoloration.)

Example III

The operation of Example II was repeated with the charge of identical composition and with the use of substantially identical operating conditions with the exception that a catalyst consisting essentially of 10% nickel and 90% alumina was used. After a period of only about 100 hours of operation the catalyst was exhausted, treated alcohol had an aldehyde content of 0.8% and the phthalic ester formed therewith showed substantially no color improvement over that obtained from the untreated charge. (Extinction coefficient K-phthalic acid ester=above 0.20.)

Example IV

A catalyst "D" having the following composition: Ni—40 parts, $SiO_2$—11.2 parts, $Al_2O_3$—48.8 parts by weight was prepared by the procedure set forth in the preparation of catalyst "A" in Example I. A catalyst "E" having the following composition: Ni—40 parts and $Al_2O_3$—60 parts by weight was also prepared. The method of preparation was substantially that used in the preparation of catalyst "D" modified to the extent of avoiding the addition of a silicate precipitating agent and the formation of nickel silicate. The nickel was therefore present in the finished catalyst "E" in the form of reduced nickel in the absence of any substantial amount of nickel silicate.

A mixture of heptyl, octyl and nonyl alcohols, obtained by the OXO process, was treated in separate operations with the above catalysts, "D" and "E," under substantially the same operating conditions set forth above in the refining operation of Example II. The alcohol charge had an aldehyde content of 3.5% and the phthalic acid esters prepared therewith were badly discolored. (Extinction coefficient K-phthalate ester=greater than 1.)

In the operation using the catalyst "D" the product obtained after 563 hours of continuous operation still had an aldehyde content below 0.13 and the phthalic acid esters prepared therewith were free of any substantial discoloration. (Extinction coefficient K-phthalic ester=0.04.)

In the operation using the catalyst "E," containing no nickel silicate, the aldehyde content of the treated product was as high as 0.26 after only 72 hours of operation. The phthalic acid ester prepared with the treated product after only 72 hours' operation was discolored. (Extinction coefficient K-phthalic ester=0.18.)

The invention claimed is:

1. The process for refining crude synthetic alcohols containing contaminant amounts of organic impurities which comprises contacting said crude alcohols in the vapor phase, in the presence of added hydrogen, at a temperature of from about 80° C. to about 200° C., with a stationary bed of solid catalyst consisting essentially of about 25% to about 90% of nickel in intimate admixture with about 75% to about 10% of solid carrier material, about 20% to about 60% of said total nickel content being in the form of nickel silicate, the remainder of said total nickel content being in the form of reduced nickel.

2. The process for refining crude synthetic hydrocarbon alcohols obtained by hydrogenation of reaction products formed by the reaction between carbon monoxide, hydrogen and an unsaturated organic compound having an olefinic unsaturation, said crude alcohols containing a contaminant amount of unsaturated organic impurities, which comprises contacting said crude alcohols in the vapor phase, in the presence of added hydrogen, at a temperature of from about 80° C. to about 200° C., with a stationary bed of solid catalyst consisting essentially of about 25% to about 90% of nickel in intimate admixture with about 75% to about 10% of solid carrier material, about 20% to about 60% of said total nickel content being in the form of nickel silicate, the remainder of said total nickel content being in the form of reduced nickel.

3. The process in accordance with claim 2 wherein said solid carrier material is an adsorptive support material.

4. The process in accordance with claim 2 wherein said solid carrier material is bauxite.

5. The process for refining crude synthetic hydrocarbon alcohols having from five to twenty carbon atoms to the molecule obtained by hydrogenation of reaction products formed by the reaction between carbon monoxide, hydrogen and an olefin, said crude synthetic alcohols containing a contaminant amount of carbonylic impurities, which comprises contacting said crude alcohols in the vapor phase, in the presence of added hydrogen, at a temperature of from about 80° C. to about 200° C., with a stationary bed of solid catalyst consisting essentially of about 35% to about 90% of nickel in intimate admixture with about 65% to about 10% of adsorptive alumina, about 20% to about 60% of said total nickel content being in the form of nickel silicate, the remainder of said total nickel content being in the form of reduced nickel.

6. The process for refining crude synthetic hydrocarbon alcohols having from five to twenty carbon atoms to the molecule obtained by hydrogenation of reaction products formed by the reaction between carbon monoxide, hydrogen and an olefin, said crude synthetic alcohols containing a contaminant amount of carbonylic impurities, which comprises contacting said crude alcohols in the vapor phase, in the presence of added hydrogen, at a temperature of from about 80° C. to about 200° C., with a stationary bed of solid catalyst consisting essentially of about 35% to about 90% of nickel in intimate admixture with about 65% to about 10% adsorptive bauxite, about 20% to about 60% of said total nickel content being in the form of nickel silicate, the remainder of said total nickel content being in the form of reduced nickel.

7. The process for refining crude synthetic nonyl alcohols obtained by hydrogenation of reaction products formed by the reaction between carbon monoxide, hydrogen and an olefin, said crude nonyl alcohols containing contaminant amounts of carbonylic impurities, which comprises contacting said crude alcohols in the vapor phase, in the presence of added hydrogen, at a temperature of from about 80° C. to about 200° C., with a stationary bed of solid catalyst consisting essentially of about 35% to about 90% of nickel in intimate admixture with about 65% to about 10% of adsorptive alumina, about 20% to about 60% of said total nickel content being in the form of nickel silicate, the remainder of said total nickel content being in the form of reduced nickel.

8. The process for refining crude synthetic nonyl alcohols obtained by hydrogenation of reaction products formed by the reaction between carbon monoxide, hydrogen and an olefin, said crude nonyl alcohols containing contaminant amounts of carbonylic impurities, which comprises contacting said crude alcohols in the vapor phase, in the presence of added hydrogen, at a temperature of from about 80° C. to about 200° C., with a stationary bed of solid catalyst consisting essentially of about 35% to about 90% of nickel in intimate admixture with about 65% to about 10% of bauxite, about 20% to about 60% of said total nickel content being in the form of nickel silicate, the remainder of said total nickel content being in the form of reduced nickel.

9. The process for refining crude synthetic nonyl alcohols obtained by hydrogenation of reaction products formed by the reaction between carbon monoxide, hydrogen and an olefin, said crude nonyl alcohols containing contaminant amounts of carbonylic impurities, which comprises contacting said crude alcohols in the vapor phase, in the presence of added hydrogen, at a temperature of from about 80° C. to about 200° C., with a stationary bed of solid catalyst consisting essentially of about 40% nickel, about 11% $SiO_2$ and about 49% of bauxite.

HAN HOOG.
WILLEM FREDERIK ENGEL.
JACOB KOOME.

No references cited.